United States Patent
Zeng

(10) Patent No.: US 9,120,350 B2
(45) Date of Patent: Sep. 1, 2015

(54) DEVICE FOR LIMITING SWIVEL OF A WHEEL

(71) Applicant: WONDERLAND NURSERYGOODS COMPANY LIMITED, Hong Kong (HK)

(72) Inventor: Hai-Bo Zeng, Guangdong (CN)

(73) Assignee: WONDERLAND NURSERY GOODS COMPANY LIMITED, Hong Kong (HK)

( * ) Notice: Subject to any disclaimer, the term of this patent is extended or adjusted under 35 U.S.C. 154(b) by 0 days.

(21) Appl. No.: 14/219,523

(22) Filed: Mar. 19, 2014

(65) Prior Publication Data

US 2014/0284895 A1 Sep. 25, 2014

(30) Foreign Application Priority Data

Mar. 22, 2013 (CN) .......................... 2013 1 0094644

(51) Int. Cl.
*B60B 33/00* (2006.01)
*B60B 33/02* (2006.01)

(52) U.S. Cl.
CPC ............. *B60B 33/025* (2013.01); *B60B 33/023* (2013.01); *B60B 33/0068* (2013.01); *B60B 2900/113* (2013.01); *B60B 2900/3312* (2013.01)

(58) Field of Classification Search
CPC .... B60B 33/006; B60B 33/02; B60B 33/023; B60B 33/025
USPC .................................. 16/35 R, 18 CG; 280/86
See application file for complete search history.

(56) References Cited

U.S. PATENT DOCUMENTS

| | | | | |
|---|---|---|---|---|
| 4,684,150 A * | 8/1987 | Specktor et al. | ......... | 280/86.753 |
| 5,303,450 A | 4/1994 | Lange | | |
| 6,163,924 A * | 12/2000 | Ward et al. | .................... | 16/35 R |
| 6,584,641 B1 | 7/2003 | Milbredt | | |
| 6,671,926 B2 * | 1/2004 | Huang | ........................ | 16/35 R |
| 7,083,175 B1 * | 8/2006 | Liu | ............................ | 280/47.38 |
| 7,231,689 B2 * | 6/2007 | Scheiber et al. | ................. | 16/19 |
| 7,258,353 B2 * | 8/2007 | Liao | ............................ | 280/47.38 |
| 2006/0103114 A1 * | 5/2006 | Huang | ........................ | 280/642 |
| 2006/0261565 A1 * | 11/2006 | Tan | ............................ | 280/47.38 |
| 2007/0102894 A1 * | 5/2007 | Derisi | ....................... | 280/86.751 |
| 2011/0221161 A1 * | 9/2011 | Ludovici et al. | ............. | 280/250.1 |

FOREIGN PATENT DOCUMENTS

| | | |
|---|---|---|
| DE | 20 2005 015 046 | 12/2005 |
| EP | 1 905 615 | 4/2008 |
| GB | 2 432 308 | 5/2007 |
| GB | 2 452 956 | 3/2009 |

* cited by examiner

*Primary Examiner* — James English
(74) *Attorney, Agent, or Firm* — Hamre, Schumann, Mueller & Larson, P.C.

(57) ABSTRACT

A device for limiting swivel of a wheel includes a fixed seat, a positioning groove, a driving member, and a limiting member. The fixed seat permits a fork to be connected pivotally thereto, and permits a frame to be connected fixedly thereto. The driving member is connected rotatably to the fixed seat. The limiting member is mounted extendably and retractably on the fixed seat. The positioning groove is disposed to the fork. The limiting member is extendable from the fixed seat to engage the positioning groove so as to prevent rotation of the fork, and is retractable into the fixed seat to remove from the positioning groove to allow for rotation of the fork. The driving member has a caroming surface rotatable to drive extension and retraction of the limiting member.

14 Claims, 10 Drawing Sheets

DEVICE FOR LIMITING SWIVEL OF A WHEEL

CROSS-REFERENCE TO RELATED APPLICATION

This application claims priority of Chinese Application No. 201310094644.7, filed on Mar. 22, 2013.

BACKGROUND OF THE INVENTION

1. Field of the Invention

This invention relates to a stroller, and more particularly to a device for limiting swivel of a stroller wheel.

2. Description of the Related Art

For convenience of stroller steering, the wheels of a stroller are typically universal wheels. In such a stroller, one wheel of the stroller is connected pivotally to a fork, which is connected pivotally to a frame, so that the moving direction of the stroller can be changed randomly. However, since the wheels are universal, the stroller is is not convenient to push.

Swivel limiting devices have been proposed to solve this problem, and are operable to limit the moving directions of the strollers. Typically, a conventional swivel limiting device includes an elongate limiting member that can be inserted into a direction limiting hole to prevent a change in the moving direction of the stroller. However, it is necessary to align the limiting member with the direction limiting hole prior to insertion of the limiting member into the direction limiting hole, thereby resulting in an inconvenient operation and a complicated structure.

SUMMARY OF THE INVENTION

The object of this invention is to provide a device for limiting swivel of a wheel, which has a simple structure and that is convenient to operate.

According to this invention, there is provided a device for limiting swivel of a wheel includes a fixed seat, a positioning groove, a driving member, and a limiting member. The fixed seat permits a fork to be connected pivotally thereto, and permits a frame to be connected fixedly thereto. The driving member is connected rotatably to the fixed seat. The limiting member is mounted extendably and retractably on the fixed seat. The positioning groove is disposed to the fork. The limiting member is extendable from the fixed seat to engage the positioning groove so as to prevent rotation of the fork, and is retractable into the fixed seat to remove from the positioning groove to allow for rotation of the fork. The driving member has a camming surface rotatable to drive extension and retraction of the limiting member.

BRIEF DESCRIPTION OF THE DRAWINGS

These and other features and advantages of this invention will become apparent in the following detailed description of a preferred embodiment of this invention, with reference to the accompanying drawings, in which.

DETAILED DESCRIPTION OF THE PREFERRED EMBODIMENT

Figure 1:
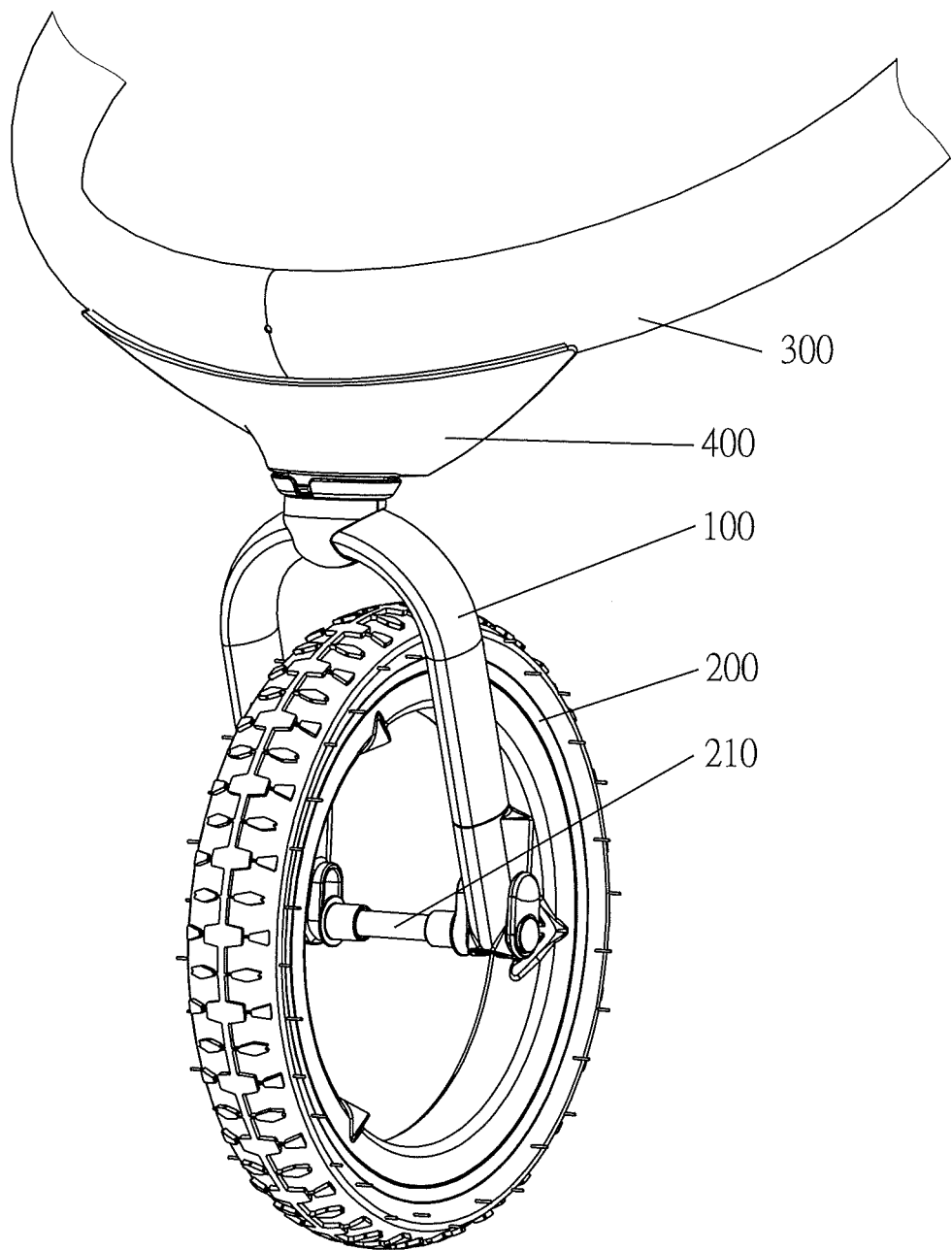
FIGS. 1 and 2 are fragmentary perspective views of a stroller including the preferred embodiment of a device for limiting swivel of a stroller wheel according to this invention.
Figure 2:
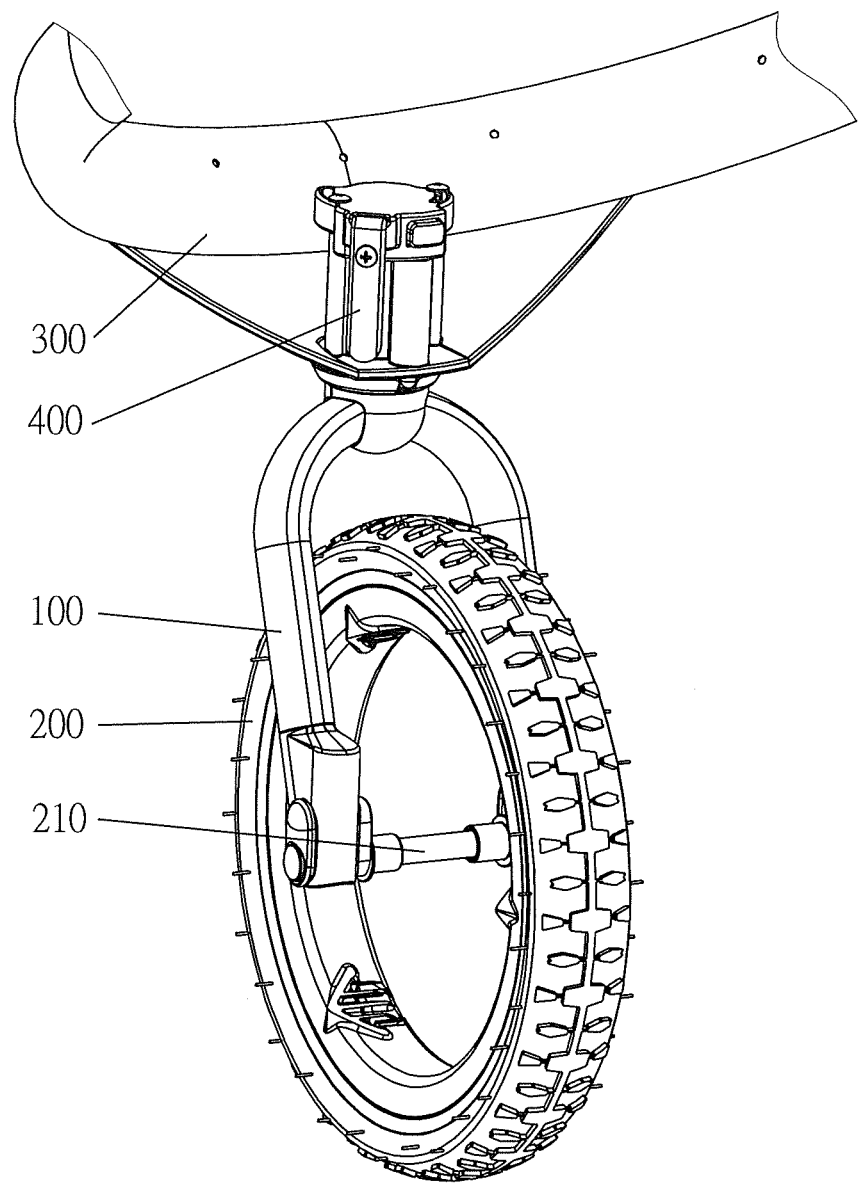
Figure 3:
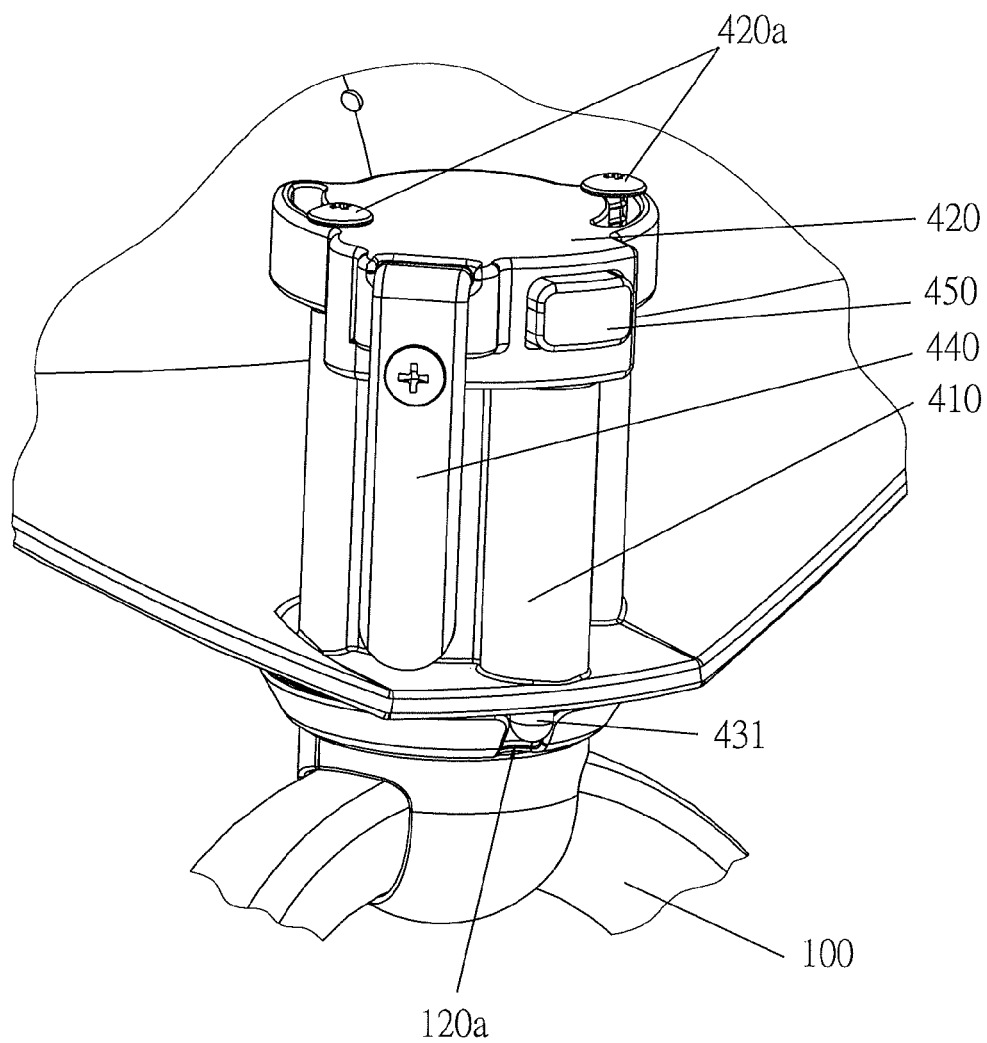
FIG. 3 is an enlarged view of a portion of FIG. 2.
Figure 4:
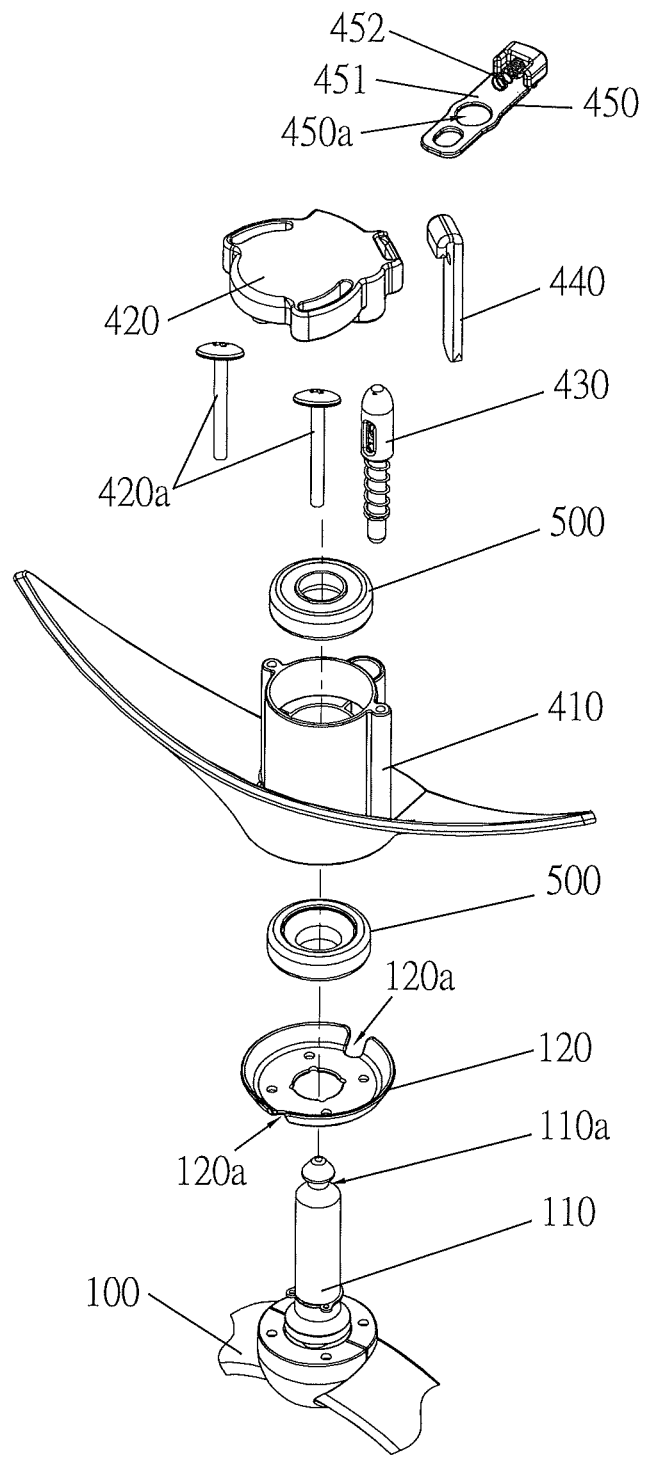
FIG. 4 is an exploded perspective view of the preferred embodiment.
Figure 5:
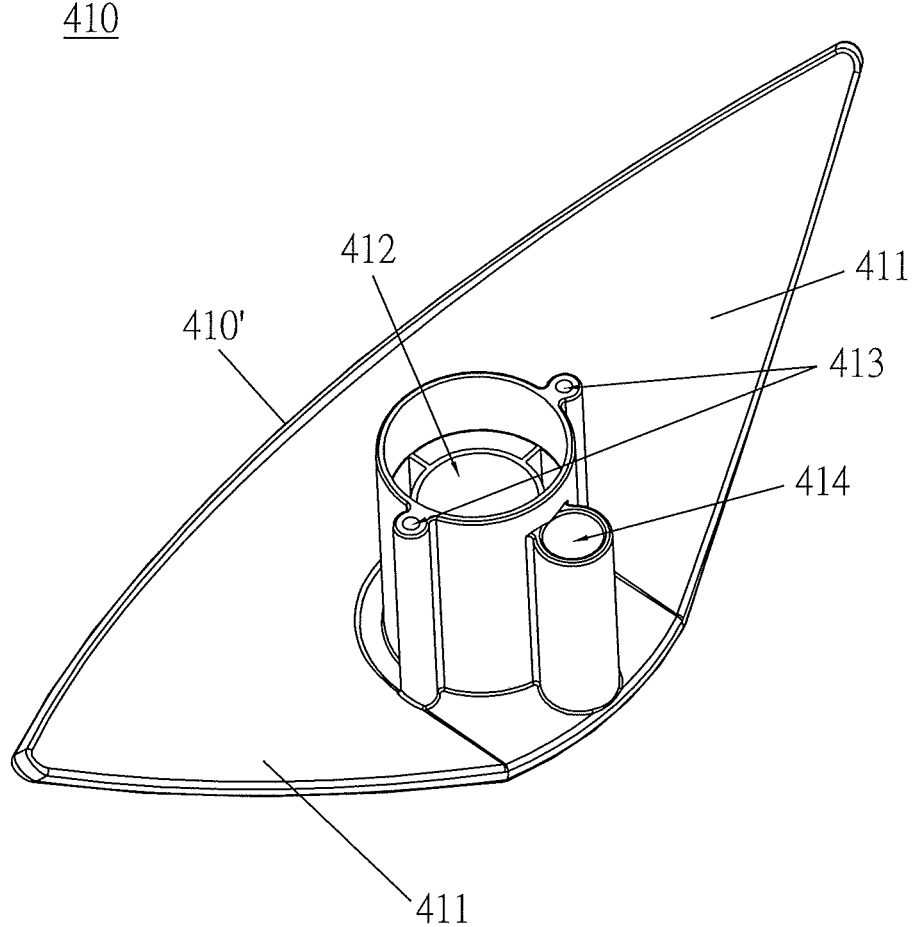
FIG. 5 is a perspective view of a fixed seat of the preferred embodiment.
Figure 6:
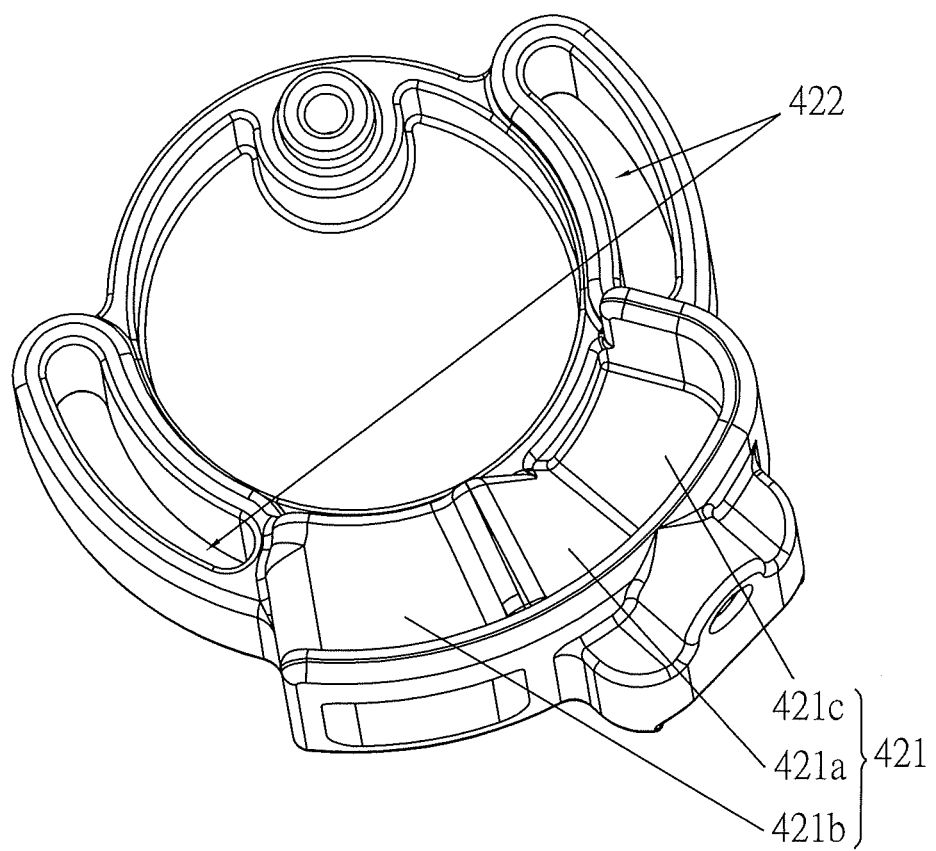
FIG. 6 is a perspective view of a driving member of the preferred embodiment.

Referring to FIG. 1, a device 400 according to this invention is adapted for limiting swivel of a front wheel 200 of a stroller. The stroller has an inverted U-shaped fork 100 mounted with the front wheel 200. The fork 100 has two lower ends connected respectively to two ends of a wheel axle 210 of the front wheel 200, and an upper end connected rotatably to a frame 300. The device 400 is disposed between the frame 300 and the fork 100.

With further reference to FIGS. 2, 3, 4, 5, and 6, the device 400 includes a fixed seat 410, a driving member 420, a limiting member 430, an operating member 440, and a quick release unit 450. The fixed seat 410 includes a seat body 410' having interconnected left and right connecting arms 411 that are connected to the frame 200, and a pivot hole 412 formed through a middle portion of the fixed seat 410. A pivot shaft 110 is disposed fixedly on the fork 100, and is inserted rotatably into the pivot hole 412 so as to allow for rotation of the fork 100 relative to the fixed seat 410 and the frame 300, thereby ensuring a reliable and safe connection between the fork 100 and the frame 300. Two bearings 500 are disposed respectively on two ends of the pivot shaft 110 and in the pivot hole 412 for reducing friction between the fixed seat 410 and the pivot shaft 110 during rotation of the fork 100 relative to the frame 300. The limiting member 430 is mounted extendably and retractably in the fixed seat 410. The driving member 420 is located directly above the pivot hole 412, and is connected rotatably to the fixed seat 410. The release unit 450 is slidably disposed in the driving member 420. The operating member 440 is connected fixedly to the driving member 420. The fork 100 is formed with at least one positioning groove 120a. In this embodiment, the fork 100 has two positioning grooves 120a. The driving member 420 has a camming surface 421 that can drive extension and retraction of the limiting member 430 with respect to one of the positioning grooves 120a upon rotation of the driving member 420. When the limiting member 430 extends into one of the positioning grooves 120a, rotation of the fork 100 relative to the frame 300 is prevented. When the limiting member 430 is removed from the one of the positioning grooves 120a, rotation of the fork 100 relative to the frame 300 is allowed.

A circular tray 120 is mounted fixedly on the fork 100. Each positioning groove 120a is configured as a notch formed in an outer periphery of the circular tray 120. The two positioning grooves 120a are angularly spaced apart from each other by 180°. When the limiting member 430 is inserted into one of the positioning grooves 120a, the circular tray 120 is locked on the limiting member 430 so as to prevent rotation of the fork 100. When the limiting member 430 is removed from the one of the positioning grooves 120a, the circular tray 120 is released from the limiting member 430 so as to allow for rotation of the fork 100. To limit the moving direction of the stroller (i.e., to prevent rotation of the fork 100) during movement of the stroller, it is only necessary to rotate the driving member 420 until the limiting member 430 is inserted into either of the positioning grooves 120a, so that the stroller can be moved in only a forward or rearward direction. As such, the device 400 has a simple structure, and can lock the fork 100 effectively on the frame 300. Alternatively, the circular tray 120 may be formed with only one positioning groove 120a.

Figure 7:
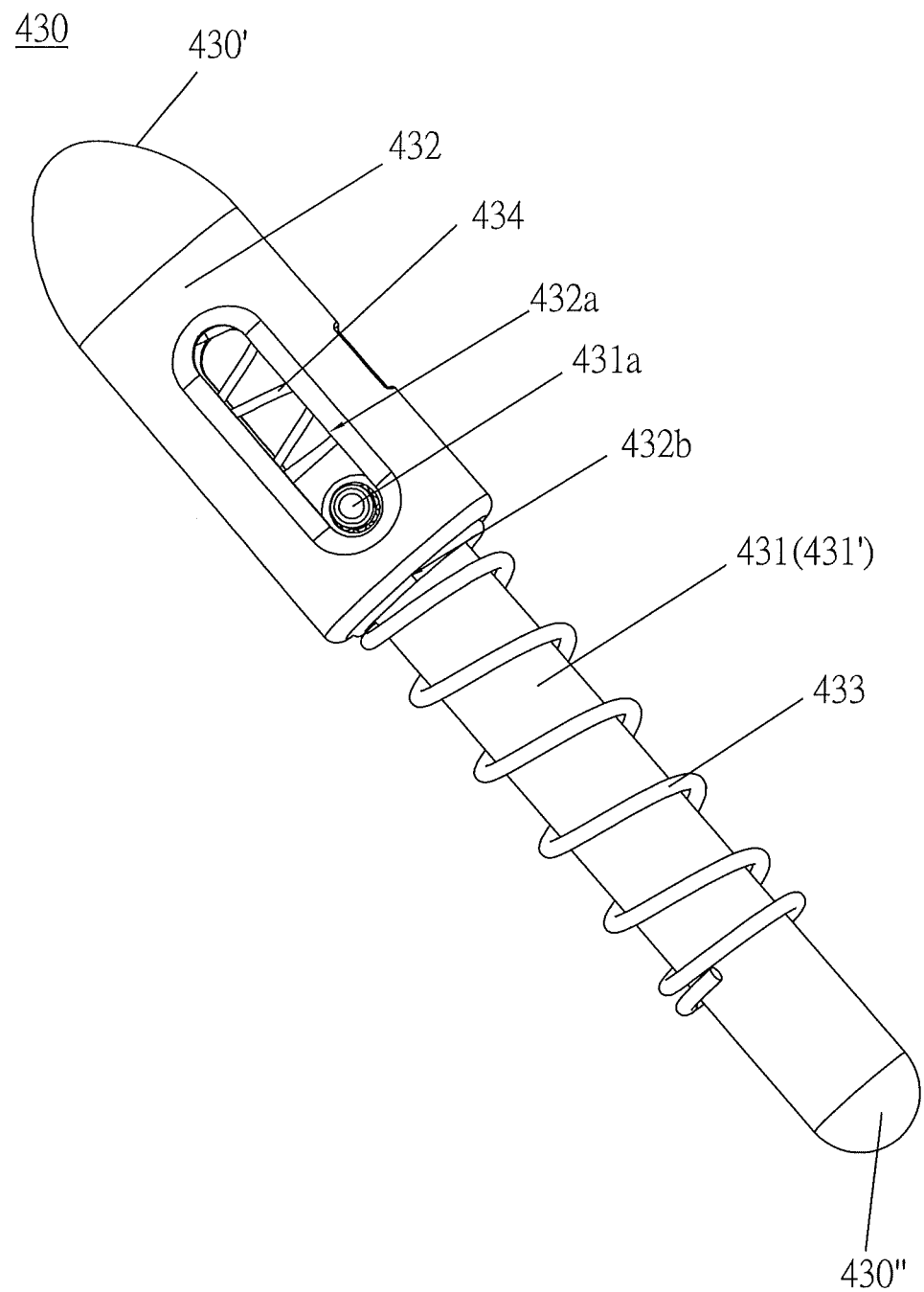
FIG. 7 is a perspective view of a limiting member of the preferred embodiment.

The driving member 420 further has two opposite side edges each formed with a curved slide slot 422 extending along a circumferential direction with respect to the rotating axis of the driving member 420. The fixed seat 410 further includes two pin holes 413 formed in the seat body 410'. Two sliding pins 420a are disposed respectively and fixedly in the pin holes 413 in the seat body 410', and extend respectively and movably through the slide slots 422 so as to allow for rotation of the driving member 420 relative to the fixed seat 410. Since each slide slot 422 has two closed ends, and since the sliding pins 420a are movable within the slide slots 422, the rotational angle of the driving member 420 is limited to ensure a reliable connection between the driving member 420 and the fixed seat 410. Furthermore, since the sliding pins 420a are engaged easily into the slide slots 422, the driving member 420 is convenient to disassemble. In an alternative arrangement, the driving member 420 is formed with only one slide slot 422, the fixed seat 410 is formed with only one pin hole 413, and only one sliding pin 420a is provided to engage the slide slot 422 and the pin hole 413. The fixed seat 410 further includes a stepped hole 414 extending in a direction parallel to the pivot hole 412 and permitting the limiting member 430 to extend therethrough. With further reference to FIG. 7, the limiting member 430 has a rounded follower end 430' biased to contact the camming surface 421, and an insert end 430" opposite to the follower end 430'. The camming surface 421 has an inclined surface portion 421a, a curved locking surface portion 421b, and a curved release surface portion 421c. The inclined surface portion 421a has two opposite ends (i.e., a lower end and an upper end) that are at different heights and that are disposed between and connected respectively to the locking surface portion 421b and the release surface portion 421c. The locking surface portion 421b and the release surface portion 421c are curved such that, when the follower end 430' of the limiting member 430 moves onto the locking surface portion 421b or the release surface portion 421c, it is automatically positioned thereon. When the follower end 430' of the limiting member 430 is in contact with the locking surface portion 421b of the camming surface 421, the insert end 430" of the limiting member 430 is inserted into one of the positioning grooves 120a. When the follower end 430' of the limiting member 430 is moved onto the release surface portion 421c of the camming surface 421, the insert end 430" of the limiting member 430 is removed from the one of the positioning grooves 120a.

Figure 9:
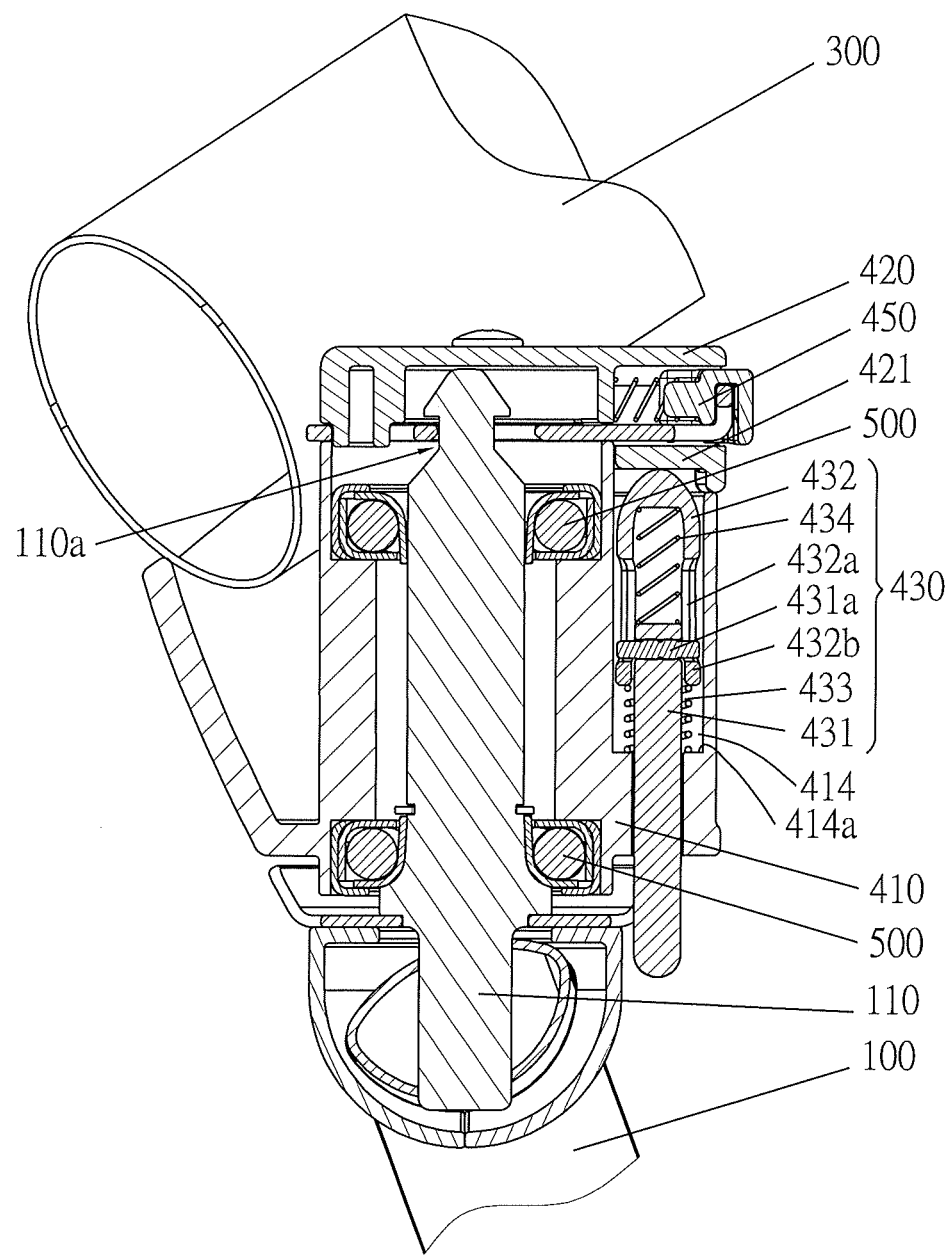
FIG. 9 is a sectional view of the preferred embodiment.
Figure 10:
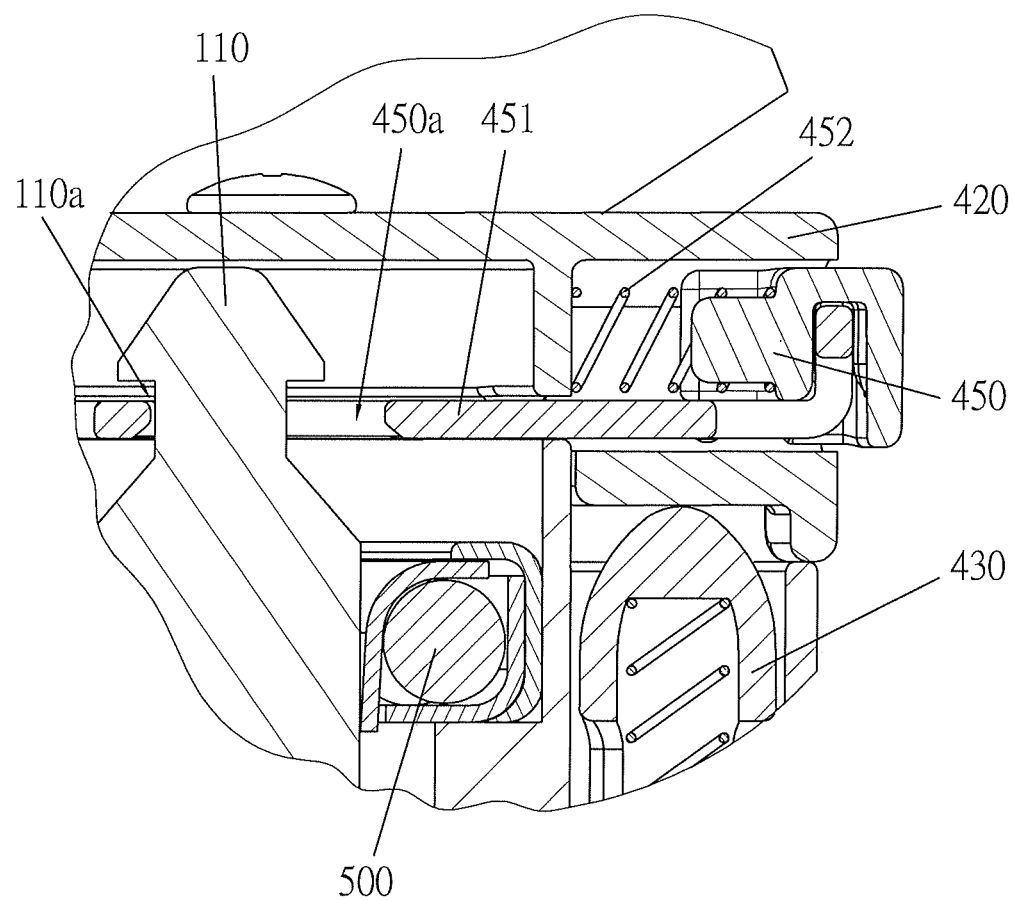
FIG. 10 is an enlarged view of a portion of FIG. 9.

With further reference to FIG. 9, the limiting member 430 includes a limiting rod 431 having the insert end 430", and a limiting sleeve 432 that is sleeved movably on the limiting rod 431 and that has the follower end 430' and a stepped end 432b opposite to the follower end 430'. A first resilient member 433 is disposed between the limiting member 430 and the fixed seat 410 for biasing the follower end 430' of the limiting member 430 to contact the camming surface 421 of the driving member 420. In this embodiment, the first resilient member 433 has two ends abutting respectively against a stepped portion 414a of an inner wall of the seat body 410' defining the stepped hole 414 and the stepped end 432b of the limiting sleeve 432. The limiting rod 431 has a rod body 431' and an insert pin 431a disposed fixedly on the rod body 431'. The limiting sleeve 432 is formed with a limiting slot 432a extending along a longitudinal direction thereof and having two opposite closed ends. The insert pin 431a extends movably through the limiting slot 432a for limiting the travel distance of the limiting rod 431 relative to the limiting sleeve 432. A second resilient member 434 is disposed between the limiting sleeve 432 and the limiting rod 431 for biasing the limiting rod 431 to extend from the limiting sleeve 432. When the limiting member 430 is misaligned from the positioning grooves 120a, the limiting rod 431 is retracted into the limiting sleeve 432. When the limiting member 430 is aligned with either of the positioning grooves 120a, the limiting rod 431 is biased by the second resilient member 434 to extend from the limiting sleeve 432. As such, extension and retraction of the limiting member 430 are allowed. Through cooperation among the camming surface 421 and the first and second resilient members 433, 434, rotation of the operating member 440 results in engagement and disengagement of the limiting member 430 with respect to the positioning grooves 120a. That is, it is not necessary for the user to align the limiting member 430 with one of the positioning grooves 120a, so that the device 400 is convenient to operate. With particular reference to FIG. 9, when the fork 100 is locked on the frame 300, the limiting member 430 extends through the stepped hole 414 and into one of the positioning grooves 120a, and the follower end 430' of the limiting sleeve 432 is in contact with the locking surface portion 421b of the camming surface 421.

Figure 8:
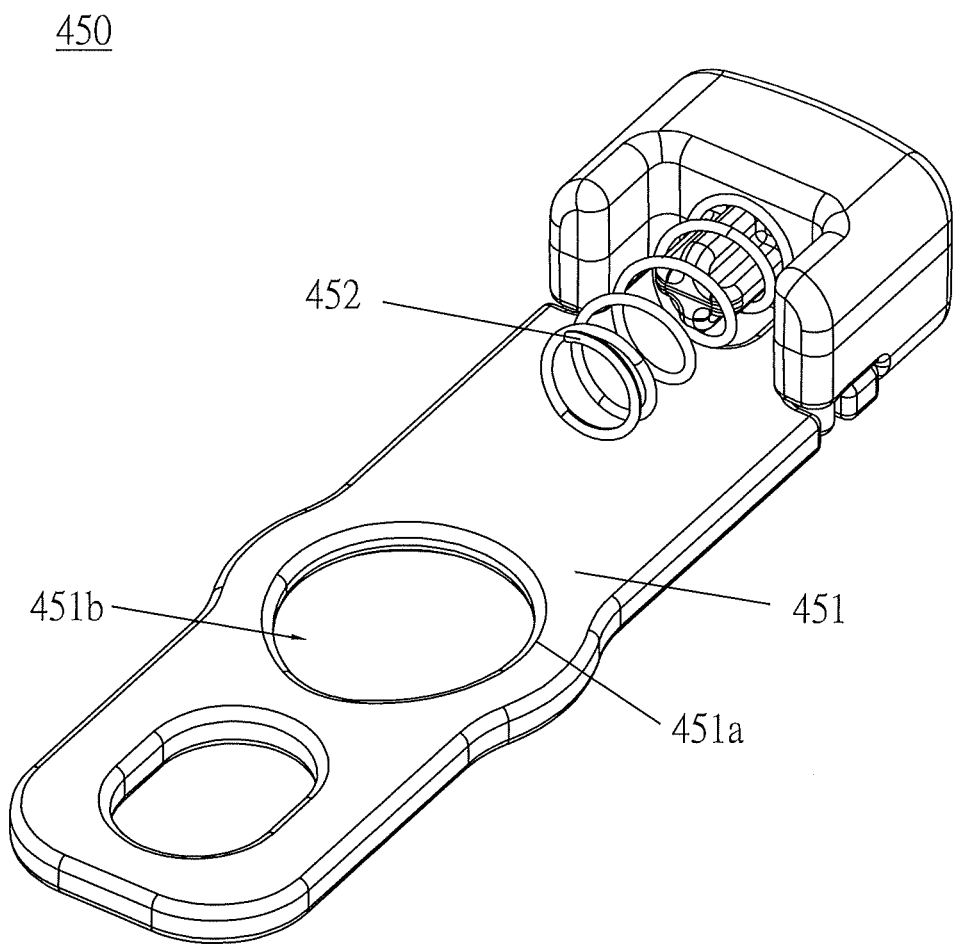
FIG. 8 is a perspective view of a quick release unit of the preferred embodiment.

With further reference to FIG. 8, the quick release unit 450 includes a sliding plate 451 and a third resilient member 452. The sliding plate 451 has an inner periphery 451a that defines an engaging hole 451b. The pivot shaft 110 extends through the engaging hole 451b, and has an outer surface formed with an annular groove 110a. The third resilient member 452 is disposed between the driving member 420 and the sliding plate 451 for biasing the inner periphery 451a to engage the annular groove 110a so as to retain the fork 100 on the fixed seat 410. As such, the inner periphery 451a of the sliding plate 451 is engaged releasably within the annular groove 110a in the pivot shaft 110. The sliding plate 451 is pushable manually in a direction to move on the driving member 420 against the biasing action of the third resilient member 452 to remove the inner periphery 451a from the annular groove 110a. In this manner, the fork 100 can be removed from the device 400 for transportation of the fork 100 and the device 400, thereby reducing the package volume and the transportation cost of the stroller frame.

When it is desired to move the stroller forwardly or rearwardly, the operating member 440 is rotated from a release position to a locking position to drive rotation of the driving member 420 relative to the fixed seat 410 in a direction to allow the locking surface portion 421b of the camming surface portion 421 to contact the follower end 430' of the limiting member 430. At the same time, the first and second resilient members 433, 434 are compressed. The compressed second resilient member 434 provides a force for biasing the limiting rod 431 to extend from the stepped hole 414. Subsequently, the stroller is moved forwardly or rearwardly to allow the limiting member 430 to align with one of the positioning grooves 120a. As soon as the limiting member 430 is align with one of the positioning grooves 120a, the second resilient member 434 pushes the limiting rod 431 into the one of the positioning grooves 120a. When it is desired to unlock the fork 100 from the frame 300, the operating member 440 is returned to the release position to allow the release surface portion 421c of the camming surface 421 to contact the follower end 430' of the limiting member 430. Since the release surface portion 421c is higher than the locking surface portion 421b, upward movement of the follower end 430' of the limiting member 430 from the locking surface portion 421b onto the release surface portion 421c results in removal of the insert end 430" of the limiting member 430 from the one of the positioning grooves 120a, so as to allow for rotation of the fork 100 relative to, the frame 300.

In view of the above, to lock the fork 100 on the frame 300, it is only necessary to rotate the operating member 440 to the locking position prior to forward or rearward movement of the stroller such that, when the stroller is moved forwardly or rearwardly, the fork 100 rotates to align the limiting member 430 with the one of the positioning grooves 120a. That is, the device 400 has a self-alignment arrangement, and thus is convenient to operate.

With this invention thus explained, it is apparent that numerous modifications and variations can be made without departing from the scope and spirit of this invention. It is therefore intended that this invention be limited only as indicated by the appended claims.

I claim:

1. A device for limiting swivel of a wheel, said device for limiting swivel being adapted to be disposed between a frame and a fork, the wheel being mounted on the fork, said device for limiting swivel comprising:
    a fixed seat, at least one positioning groove, a driving member, and a limiting member, said fixed seat being adapted to permit the fork to be connected pivotally thereto and permit the frame to be connected fixedly thereto, said driving member being connected rotatably to said fixed seat, said limiting member being mounted extendably and retractably in said fixed seat, said positioning groove being adapted to be disposed to the fork, said limiting member being extendable from said fixed seat into said positioning groove so as to prevent rotation of the fork relative to the frame, and being retractable into said fixed seat to remove from said positioning groove so as to allow for rotation of the fork relative to the frame, said driving member having a camming surface that is rotatable to drive extension and retraction of said limiting member with respect to said fixed seat,
    wherein said limiting member has a follower end biased to contact said camming surface, and an insert end opposite to said follower end, and said camming surface has a locking surface portion that is positioned such that, when said follower end of said limiting member is in contact with said locking surface portion of said camming surface, said insert end of said limiting member is inserted into said positioning groove.

2. The device for limiting swivel as claimed in claim 1, wherein said driving member has at least one side edge that is formed with a curved slide slot, said fixed seat including a seat body and a sliding pin that is disposed fixedly on said seat body and that extends movably through said slide slot so as to allow for rotation of said driving member relative to said fixed seat.

3. The device for limiting swivel as claimed in claim 1, further comprising a circular tray adapted to be mounted fixedly on the fork, said positioning groove being configured as a notch formed in an outer periphery of said circular tray.

4. The device for limiting swivel as claimed in claim 3, wherein said circular tray is formed with two said positioning grooves angularly spaced apart from each other by 180°.

5. The device for limiting swivel as claimed in claim 1, wherein said camming surface further has a release surface portion that is positioned such that, when said follower end of said limiting member is moved onto said release surface portion of said camming surface, said insert end of said limiting member is removed from said positioning groove.

6. The device for limiting swivel as claimed in claim 5, wherein said camming surface further has an inclined surface portion having two opposite ends that are at different heights and that are disposed between and connected respectively to said locking surface portion and said release surface portion.

7. The device for limiting swivel as claimed in claim 1, further comprising a first resilient member that is disposed between said limiting member and said fixed seat for biasing said follower end of said limiting member to contact said camming surface of said driving member.

8. The device for limiting swivel as claimed in claim 7, wherein said limiting member includes a limiting rod having said insert end, and a limiting sleeve that is sleeved movably on said limiting rod and that has said follower end.

9. The device for limiting swivel as claimed in claim 8, wherein said limiting rod has a rod body and an insert pin disposed fixedly on said rod body, said limiting sleeve being formed with a limiting slot having two opposite closed ends, said insert pin extending movably through said limiting slot for limiting a travel distance of said limiting rod relative to said limiting sleeve.

10. The device for limiting swivel as claimed in claim 9, further comprising a second resilient member disposed between said limiting sleeve and said limiting rod for biasing said limiting rod to extend from said limiting sleeve.

11. The device for limiting swivel as claimed in claim 1, further comprising an operating member that is connected fixedly to said driving member and that is operable manually to rotate said driving member.

12. The device for limiting swivel as claimed in claim 10, further comprising a pivot shaft adapted to be disposed fixedly on the fork, said fixed seat being formed with a pivot hole, said pivot shaft being inserted rotatably into said pivot hole so as to allow for rotation of the fork relative to said fixed seat.

13. The device for limiting swivel as claimed in claim 12, further comprising a quick release unit disposed movably on said driving member, said quick release unit including a sliding plate having an inner periphery that defines an engaging hole, said pivot shaft extending through said engaging hole and having an outer surface formed with an annular groove, said inner periphery of said sliding plate being engaged releasably within said annular groove in said pivot shaft, said sliding plate being pushable manually in a direction to remove said inner periphery from said annular groove.

14. The device for limiting swivel as claimed in claim 13, said quick release unit further includes a third resilient member disposed between said driving member and said sliding plate for biasing said inner periphery to engage said annular groove.

* * * * *